United States Patent
Schmitman

(10) Patent No.: US 6,610,193 B2
(45) Date of Patent: Aug. 26, 2003

(54) SYSTEM AND METHOD FOR THE PRODUCTION AND USE OF HYDROGEN ON BOARD A MARINE VESSEL

(75) Inventor: Craig H. Schmitman, Oxnard, CA (US)

(73) Assignee: Have Blue, LLC, Camarillo, CA (US)

( * ) Notice: Subject to any disclaimer, the term of this patent is extended or adjusted under 35 U.S.C. 154(b) by 226 days.

(21) Appl. No.: 09/836,399

(22) Filed: Apr. 17, 2001

(65) Prior Publication Data

US 2002/0090868 A1 Jul. 11, 2002

Related U.S. Application Data

(60) Provisional application No. 60/226,367, filed on Aug. 18, 2000.

(51) Int. Cl.[7] ............................. C25C 1/02; C25B 9/00; H01M 6/00
(52) U.S. Cl. .................. 205/628; 204/262; 204/264; 204/266; 204/258; 204/256; 204/270; 429/122
(58) Field of Search ................... 204/258, 256, 204/264, 262, 265, 266, 277, 278, 270; 205/628; 429/122

(56) References Cited

U.S. PATENT DOCUMENTS

| | | |
|---|---|---|
| 3,925,212 A | 12/1975 | Tchernev |
| 4,021,323 A | 5/1977 | Kilby et al. |
| 4,361,474 A | 11/1982 | Shoaf et al. |
| 4,450,060 A * | 5/1984 | Gonzalez ............ 204/268 |
| 4,883,823 A | 11/1989 | Perry, Jr. et al. ......... 518/702 |
| 5,512,145 A | 4/1996 | Hollenberg |
| 5,512,787 A | 4/1996 | Dederick ............ 290/4 |
| 5,632,870 A | 5/1997 | Kucherov |
| 5,658,448 A * | 8/1997 | Lasich ............. 205/268 |
| 5,693,201 A * | 12/1997 | Hsu et al. ........... 204/241 |
| 5,711,865 A * | 1/1998 | Caesar ............. 205/628 |
| 6,423,203 B1 * | 7/2002 | Faita et al. .......... 205/343 |

OTHER PUBLICATIONS

"A new generation in technology: Submarine Class 212(4), Siemens fuel cell battery for U 212 in the HDW fuel cell integration site (1), tank for the storage of liquid oxygen (2), hybrids storage cylinders for U 212 (3)."; 2 pp., (No Date).
Internet Papers: www.boating-industry.com/; Boating Industry International; e-News Daily; 2 pp., (No Date).
Press Release: "DCH Spotlights New Fuel Cell, Water Taxi, Safety Services Business at National Conference"; DCH Technology; Feb. 15, 2001; 2 pp.
Internet Papers: Evans, Liz; "Fuel Cell Boats: They're coming"; Boating Industry International Online; 1 page, (No Date).
Internet Papers: Evans, Liz; "Which marine companies will adopt the fuel cell first?"; 2 pp.
Foster; Richard W.; "An Investigation of the Integration of Hydrogen Technology Into Maritime Applications"; DCH Tecknology, Inc.; Proceedings of the 2000 Hydrogen Program Review; 8 pp., (No Date).
Internet Papers: Salter, Carlton; "Maritime Hydrogen Technology Development Group Formed by DCH"; NHA News; 5 pp., (No Date).
Internet Papers: Worden, Leon; "H-Powered Ships?"; May 13, 1999; 1 page.
International Search Report dated May 7, 2002 for corresponding International Application No. PCT/US01/25843, 4 pgs.

* cited by examiner

*Primary Examiner*—Donald R. Valentine
(74) *Attorney, Agent, or Firm*—Christie, Parker & Hale, LLP

(57) ABSTRACT

This invention is directed to an integrated onboard hydrogen ($H_2$) production and utilization system for all watercraft, which yields environmentally benign vessel power production without new infrastructure requirements. Water ($H_2O$) is supplied to a vessel, whether ashore, docked or underway, and is systematically converted into hydrogen and oxygen. The energy required for this process may be provided by any renewable or non-renewable source. The $H_2$ produced is either utilized at once or stored. Energy is released from the $H_2$ by one or more power plants.

88 Claims, 7 Drawing Sheets

SYSTEM AND METHOD FOR THE PRODUCTION AND USE OF HYDROGEN ON BOARD A MARINE VESSEL

CROSS-REFERENCE TO RELATED APPLICATION

This application is based on U.S. application Ser. No. 60/226,367, filed Aug. 18, 2000, the disclosure of which is incorporated by reference.

FIELD OF THE INVENTION

The present invention relates to the production and use of hydrogen onboard a marine vessel and, more particularly, to systems and methods to convert water supplied to a vessel into hydrogen ($H_2$) for later use as an energy carrier for vessel power or propulsion.

BACKGROUND OF THE INVENTION

Presently, the vast majority of marine vessels use onboard fossil fuel engines, such as diesel, fuel oil or gasoline for power and propulsion. These onboard fossil fuel propulsive systems and electrical generators are large sources of both air and water pollution. Existing fossil fuel technologies also generate noise pollution, vibrations and foul smells. Further, fuel quality and bacterial growth are problems for users of diesel and fuel oils, while explosions from trapped vapors concern operators of gasoline systems.

A need has arisen, therefore, for the development of alternative fuels which reduce or eliminate some of the problems associated with fossil-fuel technologies. There exist known technologies for reducing pollution, vibration and noise in land based vehicles, such as the use of gasoline or diesel-electric hybrid power systems, battery and fuel cell electric drives, metal hydride storage technologies, compressed natural gas, methanol, and hydrogen burning internal combustion engines. For example, a gas-hybrid system, in which $H_2$ is added to the fuel/air intake system or combustion chamber of a fossil fuel engine prior to combustion, can reduce polluting emissions. It is also known that a fuel cell power system consuming $H_2$ stored in a metal hydride tank can provide safe (relative to fire and explosion hazards), ecologically "clean" power.

However, while many developments in the "alternative" fuels industry are aimed at land based transportation systems, which reduce or eliminate some of the above referenced problems in land vehicles, these same technologies and systems show great promise for adaptation to the marine environment. For example, it is known that the most energy efficient, vibration free and quiet method of propelling a large marine vessel is via an electric motor. One additional advantage of some electric motors is that they may also be used as a generator to produce electrical energy. For example, on some gas turbine powered aircraft the starter motor reverts to a generator once the gas turbine engine has started.

For all of these systems, however, the single most significant obstacle facing implementation, with the exception of the gasoline-fueled hybrid, is the absence of a national retail "alternative" fueling infrastructure. Developing such an infrastructure would require a multi-billion dollar, decade-long commitment, and even with the advent of gasoline-fueled hybrids, the danger posed by explosion of vapors and the non-renewable nature of gasoline result in a less than optimum long term solution.

Thus, a further need has developed for a system which would reduce the polluting effects of fossil-fuel engines in maritime vessels, while also eliminating the need for a new refueling infrastructure. While presently it is known to desalinate and otherwise purify ocean or fresh water through reverse osmosis, for example, and to generate $H_2$ from that water by electrolysis, i.e., with electrical energy, and while it is also known that the most cost-effective and environmentally benign method of electrolysis uses electricity from renewable sources, such as solar (photo voltaic or PV), wind and water drag electricity generators; and while it is also known that electrical energy suitable for use in onboard electrolysis is also available from engine and auxiliary and shore power sources, these technologies have never been assembled onboard a marine vessel in such a way as to provide a ready source of energy for electrical power or propulsion without the need for the creation of a new external infrastructure.

SUMMARY OF THE INVENTION

Briefly, the present invention is directed to a system and method for producing and utilizing $H_2$ entirely onboard marine vessels eliminating the need for new refueling infrastructure.

In one embodiment, the system utilizes the $H_2$ produced by the invention as an energy carrier for propulsion and non-propulsion power requirements. In this system, $H_2O$ is obtained from the sea or other water source and then conducted to an onboard water purification device. The purified $H_2O$ is then converted via any efficient $H_2O$ to $H_2$ conversion device into hydrogen ($H_2$) and oxygen. The gaseous $H_2$ produced is either used directly by the onboard power plant(s) or stored.

In another embodiment, a method is provided so that the system may use electricity for $H_2O$ to $H_2$ conversion and other invention processes (e.g., water purification) from multiple renewable and non-renewable sources.

In another embodiment of the invention, the system eliminates the trapped vapor explosion danger of gasoline fueled power and propulsion systems by using solid state metal hydride tanking technologies for $H_2$ storage whenever possible.

In another illustrative embodiment of the present invention a system is provided to improve the efficiency of the system by recycling fuel cell waste heat and condensation of steam exhaust for re-use by the electrolysis components.

In yet another embodiment the invention is directed to a method for the production and utilization of $H_2$ onboard a marine vessel utilizing the systems described above.

Preferred examples of certain advantageous embodiments of the processes in accordance with the present invention are set forth in the accompanying illustrations and tables together with preferred embodiments of the specific elements of this invention required to properly carry out this invention.

In the illustrations and tables and in the following text describing the process and embodiments, the elements of the apparatus and the general features of the procedures are shown and described in relatively simplified and generally symbolic manner. Appropriate structural details and parameters for actual operation are available and known to those skilled in the art with respect to the conventional aspects of the process.

DETAILED DESCRIPTION OF THE INVENTION

The present invention is directed to a system and method for the production and utilization of hydrogen gas ($H_2$) on-board a marine vessel.

Figure 1:
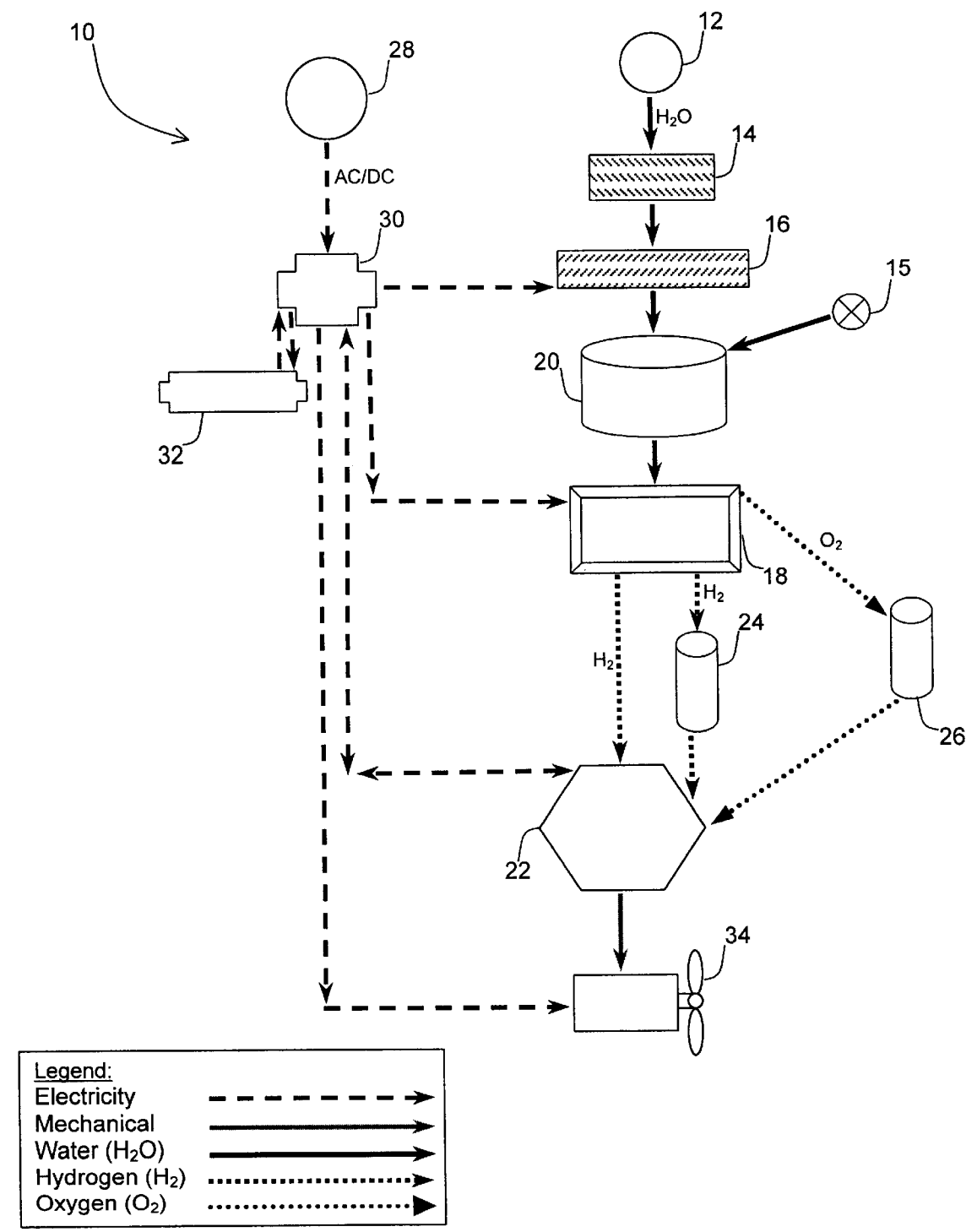
FIG. 1 is a process flow chart of the principal process methods and steps according to one embodiment of the invention.

One embodiment of the hydrogen production and utilization system 10 of the present invention is shown in FIG. 1. Water is obtained from a water source 12, e.g., sea, river, lake, estuary, municipal supply etc. Intake of water into the system may be accomplished via any standard method, such as, for example, via a standard seacock, hose attachment or other opening. In one embodiment the water supply is in fluid communication with a pre-filter 14 which filters the water, i.e., strains the water to remove debris.

The source water is then conducted to an additional onboard water purification device 16, commonly called a "watermaker," which is in fluid communication with the water supply 12. The water purification device 16 further treats the water and then conducts the water to the water-to-hydrogen conversion device 18. The amount of supplementary treatment is variable and based on specifications provided by the manufacturer of the water-to-hydrogen conversion device 18. Some supplementary water treatments may include, for example, desalinization, demineralization, and/or deionization. Any suitable water purification device 16 may be utilized in the system, such as, for example, reverse osmosis, submerged tube, multiple effect, two stage and multi stage, and vacuum vapor compression types. The resulting water is referred to hereafter as "product water," which is stored in a product water tank 20 in fluid communication with the water purification device 16. Alternatively, pre-filtered and purified water could be introduced directly into the product water storage tank 20 through an external valve 15.

The product water then passes into a water-to-hydrogen conversion device 18 and is converted via any efficient $H_2O$-to-$H_2$ conversion technology into hydrogen and oxygen ($O_2$). Any suitable $H_2O$ to $H_2$ conversion technology may be utilized in the present system as a conversion device 18, such as, for example, an electrolyzer (alkaline, polymer membrane, steam {using solid oxide electrolytes}, or any other method), a multiphoton photoelectrochemical device, a multiple-band-gap photoelectrochemical cell, or a photo-electrolysis device. A system may have one or more of the above devices and systems may include a mix of these technologies.

The gaseous $H_2$ produced by the conversion device 18 is either directly utilized by the onboard power plant(s) 22, which is/are adapted to permit the $H_2$ gas to flow therein, or the $H_2$ gas is stored in a tank 24 for later use by the power plant(s) 22, where the tank 24 is in fluid communication with the conversion device 18 and the power plant 22. The $H_2$ can be either directly stored in the tank 24, or it can be compressed by a compressor (not shown) and stored, or compressed, liquified via a liquification system (not shown), and stored as liquid hydrogen ($LH_2$) or "slush" in the onboard tank 24. Storage tanks used may include any suitable technology, such as, for example, metal hydride tank technology, composite tank technology, vacuum insulated composite tank technology, carbon nanotubes, or any other efficient $H_2$, $LH_2$, or "slush" storage technology. Alternatively hydrogen gas could be introduced directly into the hydrogen storage tank 24 from an external source through a valve (not shown).

The oxygen produced during the $H_2O$-to-$H_2$ conversion can be vented into the atmosphere or stored in an oxygen storage tank 26. The stored oxygen can then be consumed to enhance the performance of the power plant(s) 22 or utilized for any other suitable purpose. The $O_2$ can be either directly stored in the tank 26, or it can be compressed by a compressor (not shown) and stored, or compressed, liquified by a liquification system (not shown), and stored as liquid oxygen ($LO_2$) in the onboard tank 26. Alternatively oxygen gas could be introduced directly into the oxygen storage tank 26 from an external source through a valve (not shown).

The electrical components of the system 10, such as the water purification device 16 and the conversion device 18, used in the $H_2O$-to-$H_2$ conversion steps may be powered by one or more electrical source supplies 28 via a power distribution device 30. The electrical source supply 28 can comprise any suitable technology, including, one or more of the following devices: solar electric systems (Photo Voltaic); solar furnace steam generators; wind generators; water drag generators (hydroelectric); human-powered generators (e.g., attached to an "exercycle"); electrical power from the vessel's main or auxiliary engines; nuclear power generators; or onshore electrical power (shore power or utility provided shore power). Conventional renewable energy sources, such as those listed above, generally generate low-voltage DC current. This power may not be directly suitable for use via the other components of the system, such as, for example, the conversion device 18 or the purification device 16. In such cases a power conditioner (not shown) may be installed between the power source 28 and the distribution device 30, between the distribution device 30 and at least one power utilizing component or may be included as an integral part of either the power source 28 or distribution device 30. Any power conditioning device suitable for conditioning the power generated by the power source 28 for use by the other power consuming components of the system may be utilized, such as, for example, a step-up transformer and an AC inverter.

The energy supplied via the power plant(s) 22 and the electrical source supply 28 may be utilized immediately, either directly or after appropriate conditioning, or can be stored in an energy storage device 32 in electrical communication with the power distribution device 30. The energy storage device 32 can utilize any known energy storage technology, such as, for example, commercially available deep-cycle marine batteries or other efficient electrical storage devices. There may be one or more of these energy storage devices 32, or any other electrical energy storage technology in any embodiment of the invention. The energy storage device 32 can be utilized for buffer storage of electrical energy from the electrical source supply 28 and the energy stored therein may be used to provide power to the invention components (e.g., the water purification device 16 and the conversion device 18) and on-demand power for propulsion or other requirements via the power distribution device 30.

The hydrogen produced in the conversion device 18 either directly or via a hydrogen storage device 24 passes into the power plant(s) 22 where it is suitably consumed and converted in utilizable energy. Any power plant 22 may be utilized which is capable of converting the energy potential of $H_2$ into mechanical or electrical energy for propulsion and or non-propulsion utilization onboard a marine vessel. Hydrogen use may include the addition of $H_2$ to the fuel/air intake system of any fossil fuel or alternative fuel power plant 22, such as, gasoline, diesel, compressed natural gas, methanol, ethanol, etc. to improve performance and reduce undesirable emissions.

The power plants 22 contemplated for use under this invention include, but are not limited to: electrical power plants, such as a fuel cell or any direct or alternating current electrical motor whose power is provided by electricity created by a hydrogen consuming fuel cell; mechanical power plants, such as hydrogen or fossil fuel consuming or burning ("powered") internal combustion piston engine, hydrogen or fossil fuel powered lean-burn spark-ignited engine, hydrogen or fossil fuel powered steam piston engine, hydrogen or fossil fuel powered steam turbine engine, hydrogen or fossil fuel powered gas (jet) turbine engine, hydrogen or fossil fuel powered rotary engine, and any other hydrogen or fossil fuel powered mechanical engines not listed; electrical/mechanical "hybrid" power plants, such as direct or alternating current electrical motors whose electricity is provided by a generator powered in turn by a hydrogen or fossil fuel consuming or burning mechanical power plant such as any of the ones listed above.

Propulsive power is provided to propellers, water-jets, inboard/outboard transmissive drives, or any other water propelling system 34. There may be no propulsion system (as on a barge), or one or more such propulsion system in any example of the invention. These propulsive systems 34 can derive propulsive power from any of the power plants 22 described above. For example, electrical power plants 22 will derive propulsive power from the direct conversion of $H_2$ by a fuel cell into electricity which in turn will power an electric propulsive system 34 (e.g., electrical motor). The available electrical energy may be fed directly to the electrical propulsive system 34 from the power plant 22 via the power distribution device 30 or may be fed to the propulsive system 34 from a energy storage device 32 such as a battery or set of batteries via the power distribution device 30.

Mechanical power plants 22 will either directly drive propulsive systems 34 or by way of transmissions (not shown). The power will come from conversion of fuel energy into mechanical energy and then into propulsive energy.

Electrical/mechanical (hybrid) power plants 22 derive propulsive power from the conversion of $H_2$ into mechanical energy by a "mechanical" power plant 22 which consumes $H_2$. This power plant in turn will drive a generator (not shown) creating either alternating current or direct current electrical energy which in turn is consumed by an electric propulsive system 34 (e.g., electrical motor) via the power distribution device 30 to move the vessel.

Schematics of several alternative embodiments of the above inventive system and method are depicted in FIGS. 2 to 7.

Figure 2:
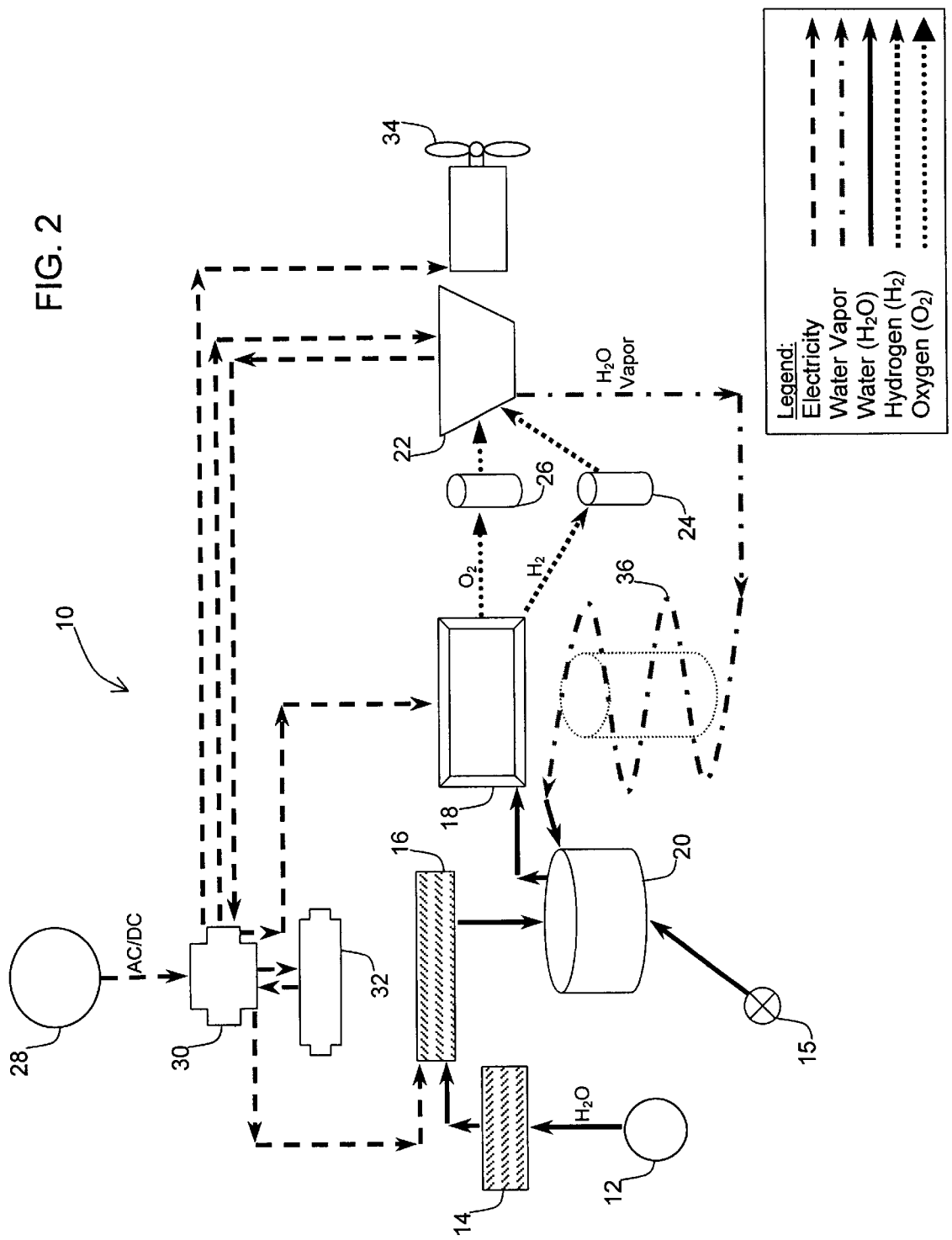
FIG. 2 is a process flow chart of the principal process methods and steps according to another illustrative embodiment of the invention in which the primary means of $H_2$ energy conversion is provided by one or more fuel cells.

FIG. 2 shows a schematic representation of an alternative embodiment of the system and method of arrangement as described above in a typical sail or power vessel whose primary means of $H_2$ energy conversion is provided by one or more fuel cell power plants 22 in electrical communication with the power distribution device 30. In this alternative embodiment, waste heat and water vapor exhausting from the fuel cell power plant(s) 22 are recycled via a heat exchanger 36 to reduce the energy required to produce additional product water and or heat other shipboard water (shower, sink, etc.) or for any other purpose requiring heat including, but not limited to, heating and ventilation, metal hydride $H_2$ storage tank(s) disassociation or steam needed for steam electrolysis.

Any fuel cell power plant 22 configuration may feature a "closed $H_2O$ loop" system, as shown in FIG. 2, in which the fuel cell "exhaust" (steam $H_2O$ vapor) is re-condensed into product $H_2O$ for the $H_2O$-to-$H_2$ conversion device 18 and waste heat is captured in a heat exchanger 36 for useful work. In this closed loop system, product $H_2O$ is converted into $H_2$ and $O_2$ in the conversion device 18, the $H_2$ is then either stored in a hydrogen storage device 24 and consumed by the fuel cell power plant 22 or directly consumed by the fuel cell power plant 22. During consumption by the fuel cell power plant 22, the $H_2$ is combined with $O_2$ to make $H_2O$ vapor in the form of steam. This steam is then condensed into liquid $H_2O$ in the heat exchanger 36 and the process is begun again.

Figure 3:
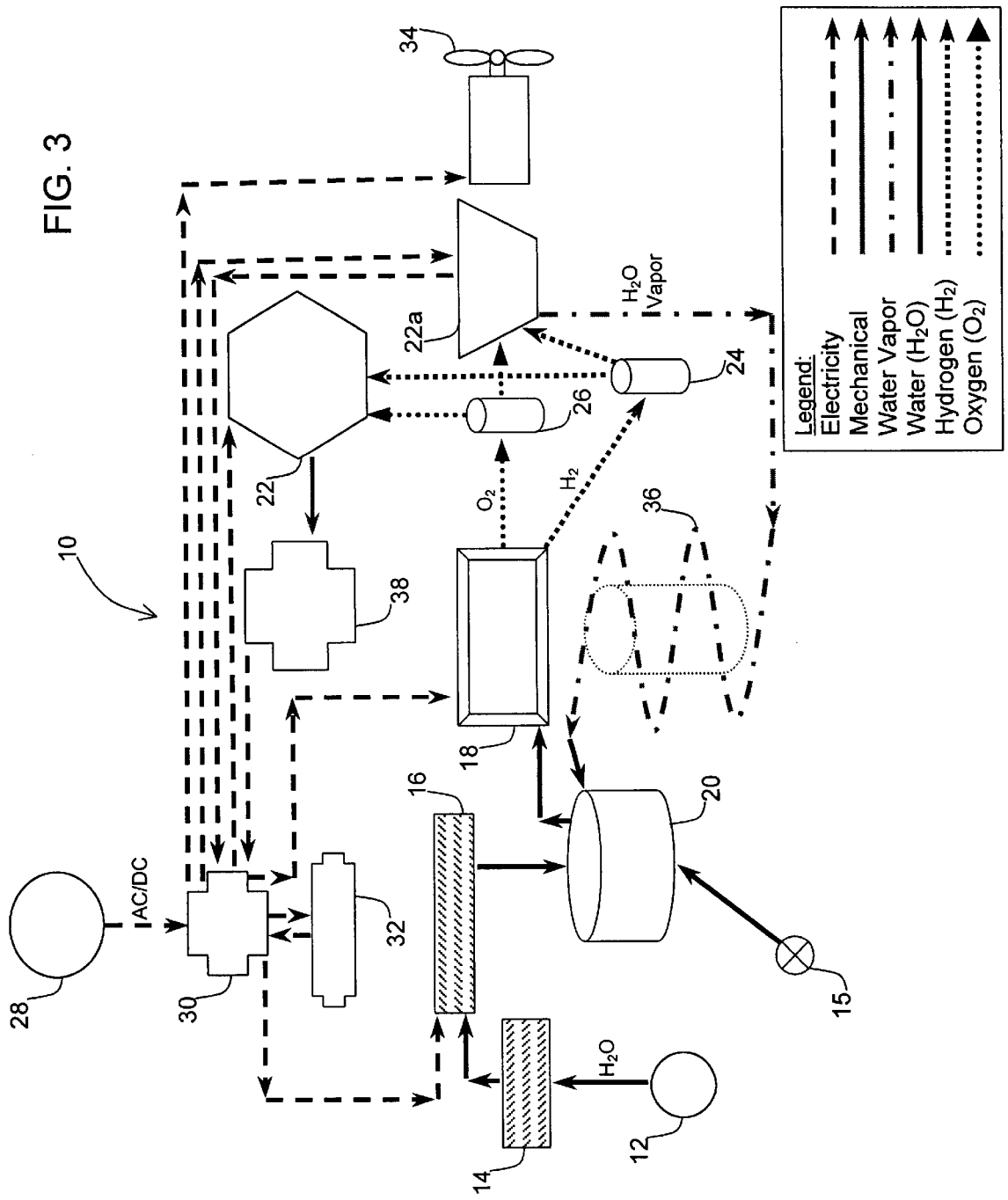
FIG. 3 is a process flow chart of the principal process methods and steps according to another illustrative embodiment of the invention in which $H_2$ energy conversion is provided by a $H_2$ consuming internal combustion engine which powers an electrical generator.

FIG. 3 shows a schematic representation of the invention components and method of arrangement in a typical sail or power vessel whose primary means of $H_2$ energy conversion is provided by a $H_2$ consuming internal combustion engine power plant 22 which powers an electrical generator 38 in electrical communication with the power distribution device 30. This configuration also illustrates a fuel cell power plant 22a in use as an auxiliary source of ship power for non-propulsive requirements in electrical communication with the power distribution device 30 and a heat exchanger 36 to provide a "closed $H_2O$ loop" system.

Figure 4:
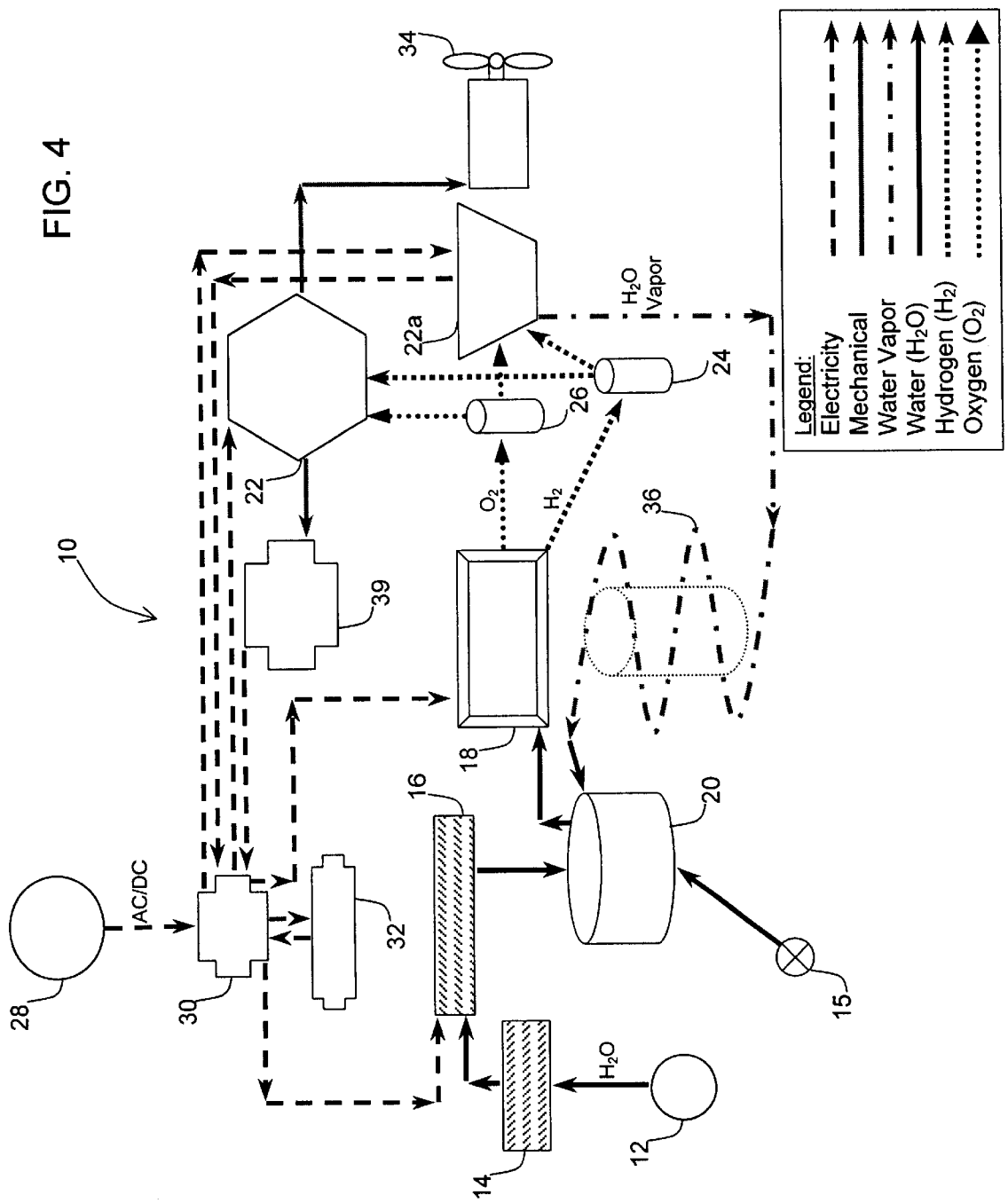
FIG. 4 is a process flow chart of the principal process methods and steps according to another illustrative embodiment of the invention in which $H_2$ energy conversion is provided by a $H_2$ consuming internal combustion engine which powers a mechanical means of power transmission to one or more propulsive systems.

FIG. 4 shows a schematic representation of the invention components and method of arrangement in a typical sail or power vessel whose primary means of $H_2$ energy conversion is provided by a $H_2$ consuming internal combustion engine power plant 22 which powers an alternator 39 in electrical communication with the power distribution device 30 and a mechanical means of power transmission to one or more propulsive systems 34. This configuration also illustrates a fuel cell power plant 22a in use as an auxiliary source of ship power for non-propulsive requirements in electrical communication with the power distribution device 30 and a heat exchanger 36 to provide a "closed $H_2O$ loop" system.

Figure 5:
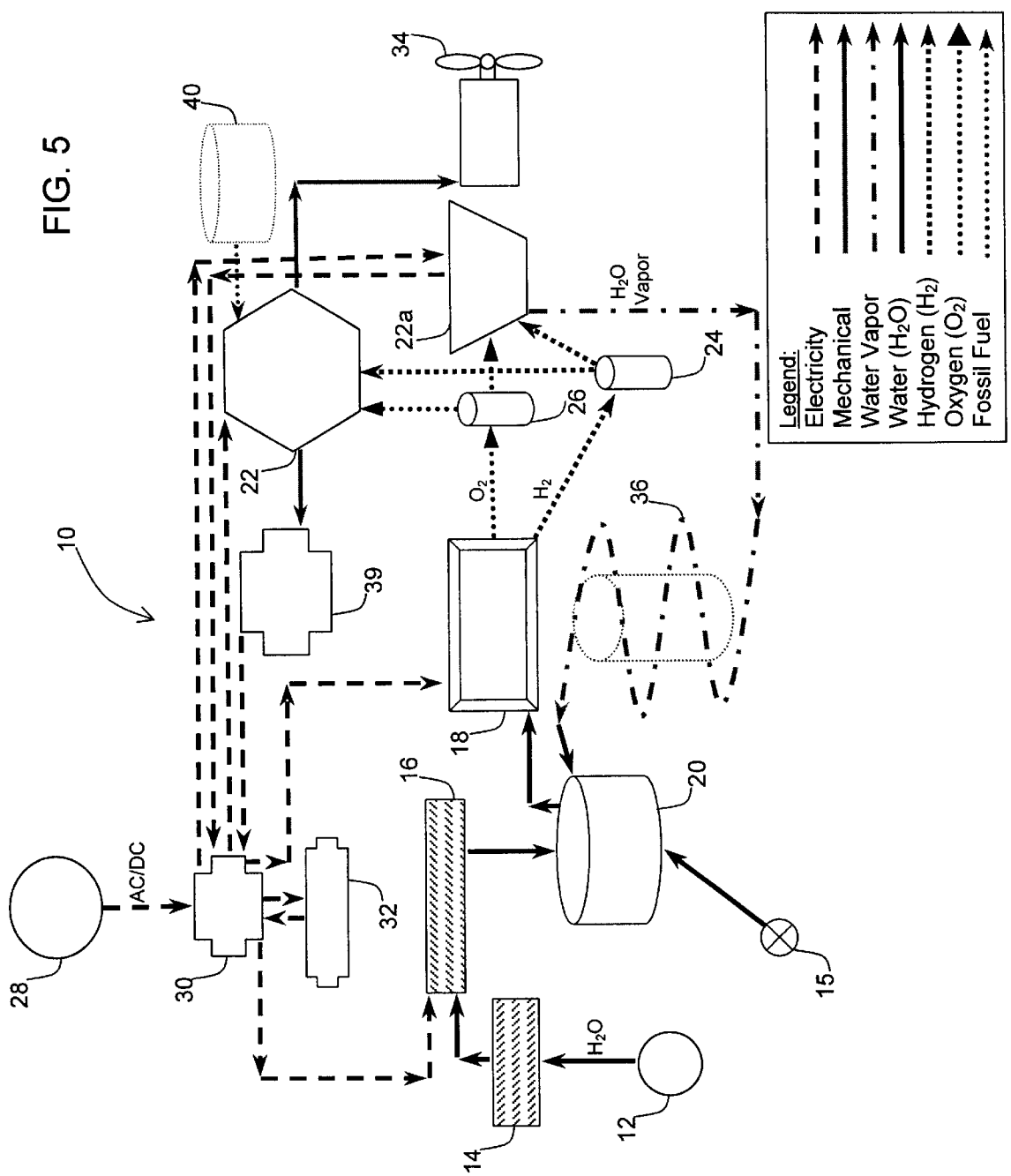
FIG. 5 is a process flow chart of the principal process methods and steps according to another illustrative embodiment of the invention in which propulsive power is produced by a fossil fuel consuming internal combustion engine in which $H_2$ is added into the fuel/air intake system or combustion chamber prior to combustion.

FIG. 5 shows a schematic representation of the invention components and method of arrangement in a typical sail or power vessel whose primary means of power to the propulsive system 34 is produced by a fossil fuel consuming internal combustion engine power plant 22 in mechanical communication with the propulsive system 34. The fossil fuel is supplied by a separate fuel tank 40 in fluid communication with the internal combustion engine power plant 22. The internal combustion engine power plant also powers an alternator 39 in electrical communication with the power distribution device 30. This embodiment reduces the polluting emissions from the internal combustion engine power plant 22 by the addition of $H_2$ into the fuel/air intake system or combustion chamber of the power plant 22 prior to combustion. The power plant 22 fuel/air intake system and mechanical power transmission system are not a part of the present invention and thus omitted for clarity. This configuration also illustrates a fuel cell power plant 22a in use as an auxiliary source of ship power for non-propulsive requirements in electrical communication with the power distribution device 30 and a heat exchanger 36 to provide a "closed $H_2O$ loop" system.

Figure 6:
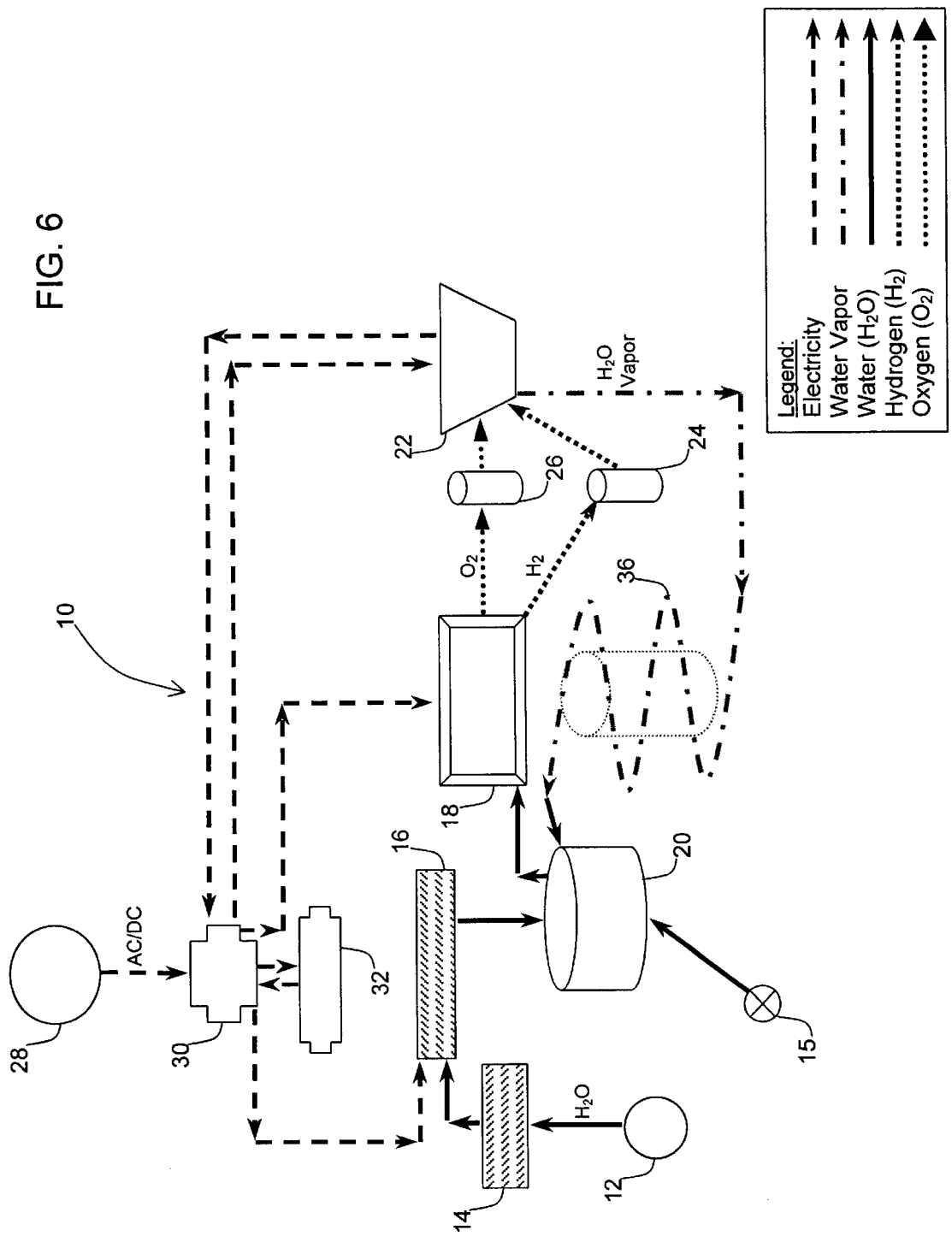
FIG. 6 is a process flow chart of the principal process methods and steps according to another illustrative embodiment of the invention in which the primary means of $H_2$ energy conversion for non-propulsive power is provided by one or more fuel cells.

FIG. 6 shows a schematic representation of the invention components and method of arrangement in a typical sail or power vessel whose primary means of $H_2$ energy conversion for non-propulsive power is provided by one or more fuel cell power plant(s) 22 in electrical communication with the power distribution device 30.

Figure 7:
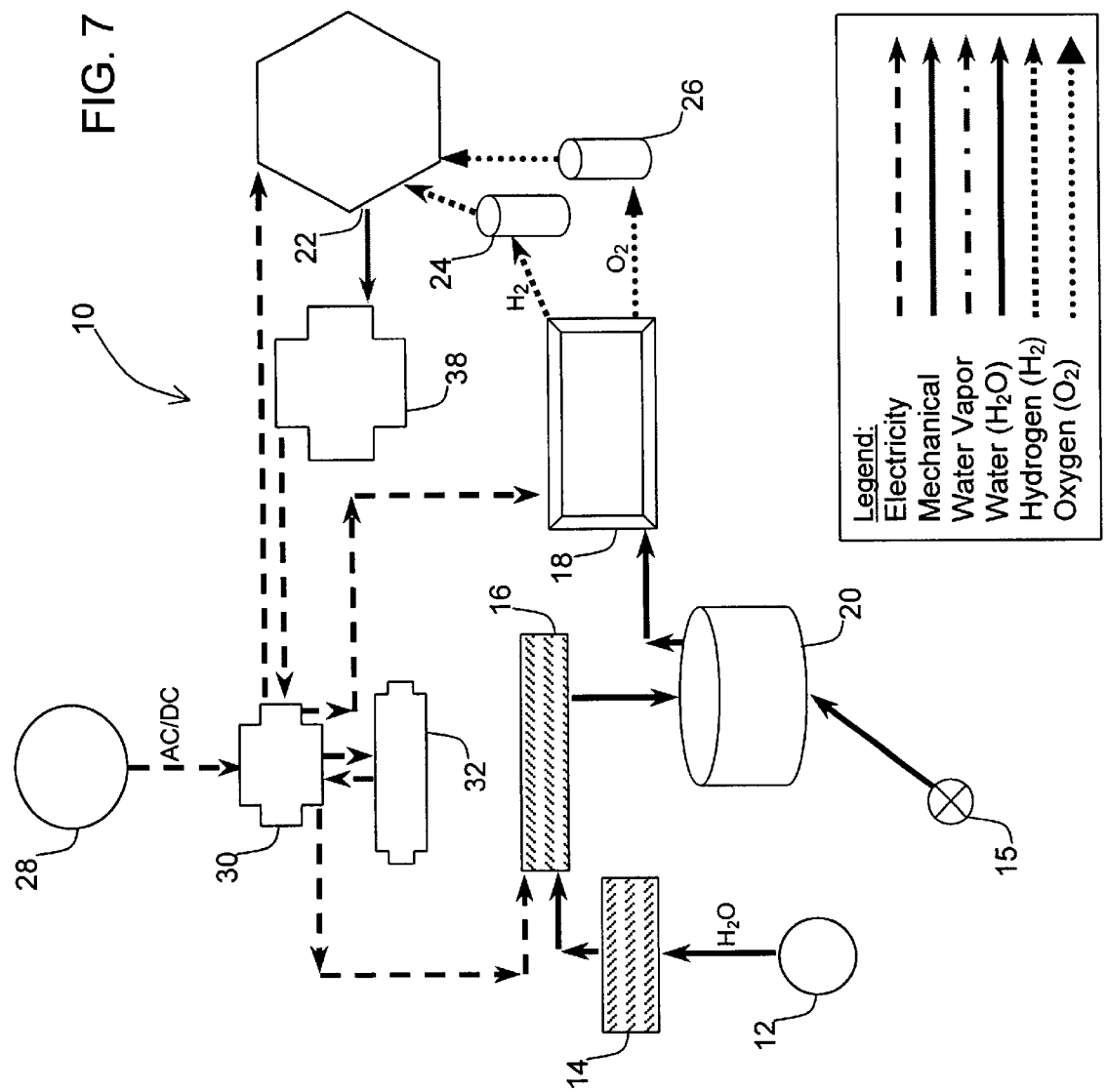
FIG. 7 is a process flow chart of the principal process methods and steps according to another illustrative embodiment of the invention in which the primary means of $H_2$ energy conversion for non-propulsive power is provided by a $H_2$ consuming internal combustion engine which powers an electrical generator.

FIG. 7 shows a schematic representation of the invention components and method of arrangement in a typical sail or power vessel whose primary means of $H_2$ energy conversion for non-propulsive power is provided by a $H_2$ consuming internal combustion engine power plant 22 which powers an electrical generator 38 in electrical communication with the power distribution device 30.

While any of the above embodiments might be utilized in the present invention, a preferred embodiment is based on the embodiment shown in FIG. 2, in which a fuel cell power plant 22 is utilized, in a sailing vessel, with several modifications. Metal hydride hydrogen storage tank(s) 24 would be used to store the $H_2$ thus reducing tank storage volume and the need for a compressor. The electrical source supply 28 would comprise a mixture of on-board water drag, solar power and wind power generators. Preferably, this vessel would also feature a "dual mode" electrolysis $H_2O$-to-$H_2$ conversion device 18 to allow for efficient low power conversion (while underway) and high power conversion (when connected to shore power) operation.

Most current water drag generators are single purpose stand alone systems. The go water drag generators utilized in the electrical source supply 28 of the preferred embodiment, would preferably use electric motors in the dual role of propulsive power source and water drag generator. This reduces the total number of components onboard, increases the electrical output of the water drag generator, simplifies operation and reduces system cost. However, the invention also anticipates some applications where single purpose water drag generators are the preferred configuration and anticipates the optimization and improvement of such single purpose components.

The photo voltaic (PV) solar panels of the electrical source supply 28 of the preferred embodiment, can either be "built in" to marine vessels or added as "after market" items mounted in the "least inconvenient" manner. For example, PV systems can be mounted along the hull, masts, windows or portholes, superstructure, deck, and, even in "hard sails" and incorporated into sail cloth. These marine "solar arrays" could also be constructed in a manner similar to those on spacecraft. Most preferably, the current embodiment would make extensive use of "built in" solar power. In this example, photo voltaic materials would be installed along the hull, on the mast, on deck, and built into the sails.

The wind generators of the electrical power supply source 28 would mount on mizzen masts if available. If not, to increase their output, telescoping poles would mount on the vessel's after rails. These poles would extend upward and aft exposing the wind generators to the greater amounts of potential wind energy available with increasing height above the water and clear of the ship's rigging by means of their rearward orientation.

The data in Table 1 reflects the operating characteristics of a re-fit 30' long sailboat using $H_2$ compressed to 5000 psi and commercially available non-optimized components. It is assumed by this example that the original configuration offered an internal combustion engine of approximately 25 horsepower mounted internally to the hull. Fuel tank capacity is limited in this example to the volumetric equivalent of 100 gallons. It is assumed that a 20 kW fuel cell is onboard. Fuel cell efficiency is conservatively estimated at 50% when it may be much higher.

If the vessel were a new build, even using compressed $H_2$, one could store more than the 100 gallons illustrated herein and increase the useful range.

By changing the storage technology to metal hydrides, current metal hydride tank technology would reduce the required volume for the same amount of $H_2$ by weight by 50%. Using metal hydride tanks would also reduce the energy required to compress the $H_2$. This would reduced the kW of energy per hour of production from the illustrated figure of 7.5 kW to approximately 2–3 kW per hour of electrolysis. However, using a metal hydride tank technology would increase system weight and complexity since a source of heat energy is required by metal hydrides to disassociate hydrogen for use. The use of metal hydrides may also require a small tank of compressed $H_2$ for immediate fuel cell or other power plant use.

TABLE 1

| Operational Parameters for 30' Sailboat |
|---|
| Amount of Product Water Consumed |
| 456.00 L |
| Hours of RO Watermaker Operation to Purify Water |
| 35.43 hrs. |
| RO Watermaker Energy Use |
| 3.40 kW |
| Rate of $H_2$ Production/hour |
| 40 Standard Cubic Feet |
| Time to Fill Tank |
| 114 hrs. |
| Energy Required to Fill Tank |
| 852 kW @ 7.5 kW/hr |
| Fuel Cell Power Conversion of Stored $H_2$ |
| 193 kW |
| Running Time Provided by Stored $H_2$ |
| 10 hrs @ 18.64 kW/hr usage |
| Speed Through Water @ Maximum Load |
| 5.5 knots |
| Range Provided by Stored $H_2$ @ Maximum Load |
| 57 nautical miles |

In an additional preferred embodiment, a power boat or ship would be based on the embodiment illustrated in FIG. 2, utilizing a fuel cell power plant 22, with several modifications. Metal hydride hydrogen storage tank(s) 24 would be used to store the $H_2$ thus reducing tank storage volume and the need for a compressor. Instead of a single purpose motor and separate water drag generator for use as an electrical supply source 28, as previously mentioned, a dual use motor/water drag generator electrical supply source 28 would be employed. The preferred embodiment would also make extensive use of "built in" solar power and wind power electrical supply sources 28. Photo voltaic materials would be installed along the hull, on the superstructure, on the mast(s), on deck, and covering windows or portholes with transparent PV film materials. The wind generators would mount on radar masts if available, and possibly embedded in the superstructure for efficient high speed use. This vessel would also feature a "dual mode" $H_2O$-to-$H_2$ conversion device 18 to allow for efficient low power conversion (while underway) and high power conversion (when connected to shore power) operation.

The data in Table 2 reflects the operating characteristics of a new build, 30' long, hydrodynamically efficient, high speed powerboat using $H_2$ compressed to 5000 psi and commercially available non-optimized components. It is assumed by this example that a fossil fueled version would require 550 horsepower mounted internally to the hull. Fuel tank capacity is limited in this example to the volumetric equivalent of 1,250 gallons. It is assumed that a 410 kW fuel cell is onboard. Fuel cell efficiency is conservatively estimated at 50% when it may be much higher.

By changing the storage technology to metal hydrides, current metal hydride tank technology would reduce the required volume for the same amount of $H_2$ by weight by 50%. Using metal hydride tanks would also reduce the energy required to compress the $H_2$ this would reduced the kW of energy per hour of production from the illustrated figure of 30 kW to approximately 8–12 kW per hour of electrolysis. However, as discussed previously, using a metal hydride tank technology would increase system weight and complexity by requiring an additional source of heat energy and potentially a small tank of compressed $H_2$ for immediate use.

It is expected that this invention will also be used as a source of non-propulsion power both in conjunction with its use for propulsive power and alone as a Ship Service Generator (SSG) supplying the needs of traditional "Hotel Loads" and other onboard power requirements.

TABLE 2

Operational Parameters for 30' Powerboat

Amount of Product Water Consumed
1,420 L
Hours of RO Watermaker Operation to Purify Water
110 hrs.
RO Watermaker Energy Use
10.59 kW
Rate of $H_2$ Production/hour
160 Standard Cubic Feet
Time to Fill Tank
355 hrs.
Energy Required to Fill Tank
10,654 kW @ 7.5 kW/hr
Fuel Cell Power Conversion of Stored $H_2$
2,415 kW
Running Time Provided by Stored $H_2$
6 hrs @ 410 kW/hr usage
Speed Through Water @ Maximum Load
35 knots
Range Provided by Stored $H_2$ @ Maximum Load
206 nautical miles The data in Table 3 reflects the operating characteristics of a Ship Service Generator system sized for a 30' long boat using $H_2$ compressed to 5000 psi and commercially available non-optimized components. It is assumed by this example that a 2 kW capacity for non-propulsion use is adequate. Fuel tank capacity is limited in this example to the volumetric equivalent of 20 gallons. It is assumed that a 20 kW fuel cell is onboard. Fuel cell efficiency is conservatively estimated at 70%.

TABLE 3

Operation Parameters for SSG on 30' Boat

Amount of Product Water Consumed
92 L
Hours of RO Watermaker Operation to Purify Water
7.15 hrs.
RO Watermaker Energy Use
0.69 kW
Hydrogen ($H_2$) Tank Size
20 gal
Capacity @ 5,000 psi.
25,754 L
Rate of $H_2$ Production/hour
1132 L
Time to Fill Tank
23 hrs.
Energy Required to Fill Tank
170 kW @ 7.5 kW/hr
Fuel Cell Power Conversion of Stored $H_2$
54 kwh
Running Time Provided by Stored $H_2$
27 hrs @ 2 kwh/hr usage As discussed above, using metal hydride tanks would also reduce the energy required to compress the $H_2$ this would reduced the kW of energy per hour of production from the illustrated figure of 7.5 kW to approximately 2–3 kW per hour of electrolysis. However, as discussed previously, using a metal hydride tank technology would increase system weight and complexity by requiring an additional source of heat energy and potentially a small tank of compressed $H_2$ for immediate use.

An illustrative example of the average non-propulsive energy usage and production for a 30' sailboat at anchor and underway is shown in Table 4, below. It will be realized that these values are only meant to be a rough calculation for a standard vessel containing the equipment listed and is not meant to confine the scope of the current invention in anyway. One skilled in the art would be able to calculate a similar power usage chart for any vessel using the method shown.

TABLE 4

Schedule of Power Consumption and Onboard Production for a 30' Sailboat
Onboard Power Consumption

| Equipment | Current in Amps | Hours of use/day | Total Amp Hrs./Day |
|---|---|---|---|
| Anchor light | 1 | 10 | 10 |
| Tri-color masthead | 1.5 | 10 | 15 |
| Running lights | 2 | 10 | 20 |
| Bilge pump | 5 | 0.25 | 1.25 |
| VHF - receive | 0.5 | 1 | 0.5 |
| VHF - transmit | 4.5 | 0.07 | 0.315 |
| Loran C | 1.5 | 3 | 4.5 |
| Radar | 12 | 2 | 24 |
| SSB radio - receive | 0.1 | 4 | 0.4 |
| SSB radio - transmit | 12 | 0.07 | 0.84 |
| Depth sounder | 0.4 | 1.5 | 0.6 |
| Autopilot | 1 | 24 | 24 |
| Anchor windlass | 20 | 0.06 | 1.2 |
| Cabin light 15 w | 1.25 | 5 | 6.25 |
| Cabin light 25 w | 2.1 | 3 | 6.3 |
| Marine stereo | 2.5 | 2 | 5 |
| Pressure water | 2.8 | 0.34 | 0.952 |
| Electric refrigerator | 6 | 12 | 72 |

TABLE 4-continued

| | | | |
|---|---|---|---|
| Microwave* | 50 | 0.3 | 15 |
| Coffee maker* | 42 | 0.04 | 1.68 |
| Hair dryer 750 w* | 63 | 0.04 | 2.52 |
| Blender* | 63 | 0.01 | 0.63 |
| Food processor* | 34 | 0.02 | 0.68 |
| Color TV (9")* | 5 | 2 | 10 |
| Color TV (19")* | 8.25 | 2 | 16.5 |
| VCR* | 1.75 | 2 | 3.5 |
| ¼" drill* | 12 | 0.1 | 1.2 |
| 750 CFM fan* | 1.1 | 3 | 3.3 |
| PC computer* | 5.8 | 1 | 5.8 |
| Watermaker | 8 | 3 | 24 |
| Electrolyser 7.5 kW (May require an AC inverter) | 500 | 24 | 12000 |

| | | |
|---|---|---|
| Total Energy Use/day: | 12,277.9 Amp Hrs. | 147.3 kWH |
| Electrolyser Power Use: | 12,000.00 Amp Hrs. | 144.0 kWH |
| Other Power Use: | 277.9 Amp Hrs. | 3.3 kWH |

| Onboard Power Production Anchored | | Onboard Power Production Underway | |
|---|---|---|---|
| Solar Panels (4 × 120 W) | 1.2 kWH | Solar Panels (4 × 120 W) | 1.2 kWH |
| Wind Power (2 × 7.6 A @ 15 knots) | 2.8 kWH | Wind Power (2 × 7.6 A @ 15) | 1.4 kWH |
| 1 A/knot Water Drag | 0 kWH | 1 A/knot Water Drag | 1.8 kWH |
| Total Production | 4.0 kWH | Total Production | 4.0 kWH |
| Standard Hotel Load | 3.3 kWH | Standard Hotel Load | 3.3 kWH |
| Excess Production | 0.7 kWH | Excess Production | 1.1 kWH |

For clarity and simplicity the present invention is described in the above example with a proton exchange membrane (PEM) fuel cell in every instance. The invention may make use of any $H_2$ consuming fuel cell technology.

Further, for clarity and simplicity the present invention is described with commercially available water conversion components. It is anticipated by the present invention that water conversion technology will continue to improve and that suppliers will offer technologies optimized for use in the present invention. Specifically, the invention anticipates the advent of highly efficient steam electrolysis water conversion systems and low power electrolysis water conversion systems which are optimized for use with renewable energy supply sources. The invention anticipates that some configurations may use dual mode or more than one conversion device or technology: one for low power and low rates of production, the other for use with shore power and offering higher rates of production.

Further yet, for clarity and simplicity the present invention is described with commercially available renewable energy supply sources. However, it is anticipated that significant improvements will be forthcoming in the key renewable electrical production technologies which will improve the practicality, cost effectiveness and total system efficiency of the present invention.

For the purposes of clarity, these examples only illustrate hydrogen production with electrical energy provided by utility shore power. A unique feature of this invention is the ability to partially replenish expended $H_2$ or $LH_2$ or "slush" supplies while underway. Sailboats or motor-sail boats and sailing ships could produce more "slush," $H_2$ or $LH_2$ than consumed if traveling in sunny and windy conditions. $H_2$ can also be produced exclusively by using renewable energy systems or in combination with energy provided by these renewable components, which would reduce the cost of such $H_2$ accordingly. This is accomplished by operation of the conversion equipment while at anchor or while tied to a dock (with or without shore power) using the power supplied by the electrical supply source(s). It should also be noted that the actual range of any vessel equipped with the present invention would be extended to the extent that the renewable electrical supply source while underway provides for the non-propulsion requirements of the vessel avoiding the consumption of $H_2$ for that purpose.

The examples set out in this application are merely illustrative, other uses will become obvious to one of skill in the art after reviewing this disclosure. This system may be utilized on any potential maritime vessel including: government vessels, such as military watercraft, submarines, oceanic research vessels, law enforcement vessels, search & rescue vessels, harbor pilot ships, environmental clean-up boats/ships, etc.; commercial vessels, such as passenger transports, water bus/tax, cruise ships, ferries, charter boats, scenic vessels, party boats, scuba-diving boats, cargo transports, container ships, coastal freighters, auto carriers, oil and other bulk carriers, tugs, oil rig work/support boats, fishing vessels and support (processing and factory) ships, etc.; recreational boats, such as power boats 15 feet and greater, small watercraft less than 15 feet (JetSkis, SeaDoo, etc.), sail boats, etc.; and all other sea, lake and river marine vehicles.

The elements of the apparatus and the general features of the components are shown and described in relatively simplified and generally symbolic manner. Appropriate structural details and parameters for actual operation are available and known to those skilled in the art with respect to the conventional aspects of the process.

What is claimed is:

1. A system for the production and utilization of hydrogen in marine applications comprising:
    a source of water;
    a source of electrical power;
    a water to hydrogen converter for converting said water into hydrogen gas and oxygen gas, said converter in fluid communication with said water source and in electrical communication with said electrical power source;
    a hydrogen power plant in fluid communication with said converter for converting said hydrogen gas into utilizable energy; and
    a power distribution device in electrical communication with the electrical power source, the converter, and the power plant.

2. The system for the production and utilization of hydrogen described in claim 1, wherein the source of water further comprises:
    a source of unpurified water;
    a water purifier for purifying said unpurified water in fluid communication with said unpurified water source and in electrical communication with said power distribution device.

3. The system for the production and utilization of hydrogen described in claim 2, wherein the water purifier is a reverse osmosis water purifier in electrical communication with the power distribution device.

4. The system for the production and utilization of hydrogen described in claim 2, further comprising a pre-filter adapted to allow water to pass therethrough positioned between the source of unpurified water and the water purifier.

5. The system for the production and utilization of hydrogen described in claim 1, further comprising a hydrogen storage device having an inlet and an outlet, wherein the inlet is in fluid communication with the converter and the outlet is in fluid communication with the hydrogen power plant.

6. The system for the production and utilization of hydrogen described in claim 5, wherein the hydrogen storage device further comprises a compressor and a storage tank.

7. The system for the production and utilization of hydrogen described in claim 6, wherein the storage tank is a composite tank.

8. The system for the production and utilization of hydrogen described in claim 6, wherein the hydrogen storage device further comprises a liquification system.

9. The system for the production and utilization of hydrogen described in claim 8, in the storage tank is a vacuum insulated composite tank.

10. The system for the production and utilization of hydrogen described in claim 8, wherein the storage tank is a slush storage tank.

11. The system for the production and utilization of hydrogen described in claim 5, in the storage tank is a metal hydride tank.

12. The system for the production and utilization of hydrogen described in claim 5, wherein the storage tank is a carbon nanotube tank.

13. The system for the production and utilization of hydrogen described in claim 1, further comprising an energy storage device for storing the energy produced by at least one of the power plants and the electrical power source, said energy storage device in electrical communication with the power distribution device.

14. The system for the production and utilization of hydrogen described in claim 13, wherein the energy storage device is at least one deep-cycle marine battery.

15. The system for the production and utilization of hydrogen described in claim 1, further comprising:
    a water storage tank having an inlet in fluid communication with the water source and an outlet in fluid communication with the converter.

16. The system for the production and utilization of hydrogen described in claim 1, further comprising a propulsion device for providing motive force to a marine vessel, said propulsion device in electrical communication with the power distribution device.

17. The system for the production and utilization of hydrogen described in claim 16, wherein the propulsion device is an electrical motor in electrical communication with the power distribution device.

18. The system for the production and utilization of hydrogen described in claim 16, wherein the propulsion device is a mechanical transmission in mechanical communication with the power plant.

19. The system for the production and utilization of hydrogen described in claim 1, wherein the water to hydrogen converter is an electrolyzer.

20. The system for the production and utilization of hydrogen described in claim 19, wherein the electrolyzer is one of either a solid oxide electrolyzer or a steam electrolyzer.

21. The system for the production and utilization of hydrogen described in claim 1, wherein the water to hydrogen converter is a multiphoton photochemical device.

22. The system for the production and utilization of hydrogen described in claim 1, wherein the water to hydrogen converter is a multi-band-gap photoelectrochemical cell.

23. The system for the production and utilization of hydrogen described in claim 1, wherein the water to hydrogen converter is a photoelectrolysis device.

24. The system for the production and utilization of hydrogen described in claim 1, wherein the electrical power source is a solar electrical device.

25. The system for the production and utilization of hydrogen described in claim 1, wherein the electrical power source is a solar furnace steam source.

26. The system for the production and utilization of hydrogen described in claim 1, wherein the electrical power source is a wind power source.

27. The system for the production and utilization of hydrogen described in claim 1, wherein the electrical power source is a water drag power source.

28. The system for the production and utilization of hydrogen described in claim 1, wherein the electrical power source is a nuclear power source.

29. The system for the production and utilization of hydrogen described in claim 1, wherein the electrical power source is a human-power source.

30. The system for the production and utilization of hydrogen described in claim 1, wherein the electrical power source is an on-shore power source.

31. The system for the production and utilization of hydrogen described in claim 1, wherein the power plant is a hydrogen consuming fuel cell.

32. The system for the production and utilization of hydrogen described in claim 31, further comprising an electrical motor in electrical communication with the power distribution device.

33. The system for the production and utilization of hydrogen described in claim 32, wherein the electrical motor is also a water drag power source in electrical communication with the power distribution device.

34. The system for the production and utilization of hydrogen described in claim 31, further comprising a heat exchanger for removing excess heat and thereby condensing vaporized water into liquid water, said heat exchanger having an inlet in fluid communication with the outlet of the fuel cell and an outlet in fluid communication with the inlet of the converter.

35. The system for the production and utilization of hydrogen described in claim 34, further comprising a product water storage tank arranged between the heat exchanger outlet and the converter inlet.

36. The system for the production and utilization of hydrogen described in claim 1, wherein the power plant comprises;
    a hydrogen burning mechanical engine for converting the hydrogen into mechanical energy; and
    a generator for converting the mechanical energy of the mechanical engine into electrical energy, said generator in mechanical communication with the mechanical engine and in electrical communication with the power distribution device.

37. The system for the production and utilization of hydrogen described in claim 36, wherein the mechanical engine is a hydrogen burning internal combustion engine.

38. The system for the production and utilization of hydrogen described in claim 36, wherein the mechanical engine is a hydrogen burning steam engine.

39. The system for the production and utilization of hydrogen described in claim 36, wherein the mechanical engine is a mixed hydrogen fossil fuel burning engine.

40. The system for the production and utilization of hydrogen described in claim 36, wherein the mechanical engine is a mixed, hydrogen/biodiesel fuel burning engine.

41. The system for the production and utilization of hydrogen described in claim 1, wherein the power plant comprises both a hydrogen consuming fuel cell and a hydrogen consuming mechanical engine.

42. The system for the production and utilization of hydrogen described in claim 1, wherein the converter further comprises an oxygen storage device in fluid communication with converter for storing the oxygen gas produced from the conversion of water to hydrogen gas and oxygen gas.

43. The system for the production and utilization of hydrogen described in claim 1, wherein the electrical power source is the power plant.

44. A method for producing and utilizing hydrogen in marine applications comprising the steps consisting of:
   providing a hydrogen utilization and production system comprising;
      a source of water,
      a source of electrical power,
      a water to hydrogen converter for converting said water into hydrogen gas and oxygen gas, said converter in fluid communication with said water source and in electrical communication with said electrical power source,
      a hydrogen power plant in fluid communication with said converter for converting said hydrogen gas into utilizable energy, and
      a power distribution device in electrical communication with the electrical power source, the converter, and the power plant; and
   operating the hydrogen utilization and production system to convert water into hydrogen gas and oxygen gas, converting the hydrogen gas into utilizable energy, and distributing the energy to at least one power consuming component.

45. A system for the continuous production and utilization of hydrogen in marine applications comprising:
   a source of purified water;
   a source of electrical power;
   an energy storage device for storing electrical power;
   a water to hydrogen converter for converting said water into hydrogen gas and oxygen gas, said converter in fluid communication with said water source and in electrical communication with said electrical power source;
   a power plant in fluid communication with said converter for converting said hydrogen and oxygen gas into utilizable energy;
   a hydrogen storage device having an inlet and an outlet, wherein the inlet is in fluid communication with the converter and the outlet is in fluid communication with the hydrogen power plant;
   a oxygen storage device having an inlet and an outlet, wherein the inlet is in fluid communication with the converter and the outlet is in fluid communication with the hydrogen power plant; and
   a power distribution device in electrical communication with the electrical power source, the energy storage device, the converter, and the power plant.

46. The system for the production and utilization of hydrogen described in claim 45, wherein the source of purified water further comprises:
   a source of unpurified water;
   a water purifier for purifying said unpurified water in fluid communication with said unpurified water source.

47. The system for the production and utilization of hydrogen described in claim 46, wherein the water purifier is a reverse osmosis water purifier in electrical communication with the power distribution device.

48. The system for the production and utilization of hydrogen described in claim 46, further comprising a prefilter adapted to allow water to pass therethrough positioned between the source of unpurified water and the water purifier.

49. The system for the production and utilization of hydrogen described in claim 48, wherein the electrolyzer is one of either a solid oxide electrolyzer or a steam electrolyzer.

50. The system for the production and utilization of hydrogen described in claim 45, further comprising:
   a water storage tank having an inlet in fluid communication with the water source and an outlet in fluid communication with the converter.

51. The system for the production and utilization of hydrogen described in claim 45, further comprising a propulsion device for providing motive force to a marine vessel, said propulsion device in electrical communication with the power distribution device.

52. The system for the production and utilization of hydrogen described in claim 51, wherein the propulsion device is an electrical motor in electrical communication with the power distribution device.

53. The system for the production and utilization of hydrogen described in claim 52, wherein the electrical motor is also a water drag power source in electrical communication with the power distribution device.

54. The system for the production and utilization of hydrogen described in claim 51, wherein the propulsion device is a mechanical transmission in mechanical communication with the power plant.

55. The system for the production and utilization of hydrogen described in claim 45, wherein the water to hydrogen converter is an electrolyzer.

56. The system for the production and utilization of hydrogen described in claim 45, wherein the water to hydrogen converter is a multiphoton photochemical device.

57. The system for the production and utilization of hydrogen described in claim 45, wherein the water to hydrogen converter is a multi-band-gap photoelectrochemical cell.

58. The system for the production and utilization of hydrogen described in claim 45, wherein the water to hydrogen converter is a photoelectrolysis device.

59. The system for the production and utilization of hydrogen described in claim 45, wherein the hydrogen storage device further comprises a compressor and a storage tank.

60. The system for the production and utilization of hydrogen described in claim 59, wherein the storage tank is a composite tank.

61. The system for the production and utilization of hydrogen described in claim 59, wherein the hydrogen storage device further comprises a liquification system.

62. The system for the production and utilization of hydrogen described in claim 61, wherein the storage tank is a vacuum insulated composite tank.

63. The system for the production and utilization of hydrogen described in claim 61, wherein the storage tank is a slush storage tank.

64. The system for the production and utilization of hydrogen described in claim 45, wherein the storage tank is a metal hydride tank.

65. The system for the production and utilization of hydrogen described in claim 45, wherein the storage tank is a carbon nanotube tank.

66. The system for the production and utilization of hydrogen described in claim 45, wherein the electrical power source is a solar electrical device.

67. The system for the production and utilization of hydrogen described in claim 45, wherein the electrical power source is a solar furnace steam source.

68. The system for the production and utilization of hydrogen described in claim 45, wherein the electrical power source is a wind power source.

69. The system for the production and utilization of hydrogen described in claim 45, wherein the electrical power source is a water drag power source.

70. The system for the production and utilization of hydrogen described in claim 45, wherein the electrical power source is a nuclear power source.

71. The system for the production and utilization of hydrogen described in claim 45, wherein the electrical power source is a human-power source.

72. The system for the production and utilization of hydrogen described in claim 45, wherein the electrical power source is an on-shore power source.

73. The system for the production and utilization of hydrogen described in claim 45, wherein the power plant is a hydrogen consuming fuel cell.

74. The system for the production and utilization of hydrogen described in claim 73, further comprising an electrical motor in electrical communication with the power distribution device.

75. The system for the production and utilization of hydrogen described in claim 73, further comprising a heat exchanger for removing excess heat and thereby condensing vaporized water into liquid water, said heat exchanger having an inlet in fluid communication with the outlet of the fuel cell and an outlet in fluid communication with the inlet of the converter.

76. The system for the production and utilization of hydrogen described in claim 75, further comprising a product water storage tank arranged between the heat exchanger outlet and the converter inlet.

77. The system for the production and utilization of hydrogen described in claim 45, wherein the power plant comprises:
- a hydrogen burning mechanical engine for converting the hydrogen into mechanical energy; and
- a generator for converting the mechanical energy of the mechanical engine into electrical energy, said generator in mechanical communication with the mechanical engine and in electrical communication with the power distribution device.

78. The system for the production and utilization of hydrogen described in claim 77, wherein the mechanical engine is a hydrogen burning internal combustion engine.

79. The system for the production and utilization of hydrogen described in claim 77, wherein the mechanical engine is a hydrogen burning steam engine.

80. The system for the production and utilization of hydrogen described in claim 77, wherein the mechanical engine is a mixed hydrogen fossil fuel burning engine.

81. The system for the production and utilization of hydrogen described in claim 77, wherein the mechanical engine is a mixed, hydrogen/biodiesel fuel burning engine.

82. The system for the production and utilization of hydrogen described in claim 45, wherein the power plant comprises both a hydrogen consuming fuel cell and a hydrogen consuming mechanical engine.

83. The system for the production and utilization of hydrogen described in claim 45, wherein the energy storage device is at least one deep-cycle marine battery.

84. The system for the production and utilization of hydrogen described in claim 45, wherein the electrical power source is the power plant.

85. The system for the production and utilization of hydrogen described in claim 45 further comprising an electrical power conditioner for conditioning the electrical power in electrical communication with the power distribution device.

86. The system for the production and utilization of hydrogen described in claim 85, wherein the electrical power conditioner comprises an inverter/transformer.

87. A method for producing and utilizing hydrogen in marine applications comprising:
- providing a source of purified water;
- generating electrical power;
- storing the electrical power;
- converting said water into hydrogen gas and oxygen gas utilizing the generated electrical power;
- converting said hydrogen and oxygen gas into utilizable energy; and
- distributing the energy to at least one power consuming component.

88. A method for producing and utilizing hydrogen in marine applications comprising the steps consisting of:
- providing a hydrogen utilization and production system comprising:
  - a source of purified water,
  - a source of electrical power,
  - an energy storage device for storing electrical power,
  - a water to hydrogen converter for converting said water into hydrogen gas and oxygen gas, said converter in fluid communication with said water source and in electrical communication with said electrical power source,
  - a power plant in fluid communication with said converter for converting said hydrogen and oxgyen gas into utilizable energy,
  - a hydrogen storage device having an inlet and an outlet, wherein the inlet is in fluid communication with the converter and the outlet is in fluid communication with the hydrogen power plant,
  - a oxygen storage device having an inlet and an outlet, wherein the inlet is in fluid communication with the converter and the outlet is in fluid communication with the hydrogen power plant, and
  - a power distribution device in electrical communication with the electrical power source, the energy storage device, the converter, and the power plant; and
- operating the hydrogen utilization and production system to convert water into hydrogen gas and oxygen gas, converting the hydrogen gas into utilizable energy, and distributing the energy to at least one power consuming component.

* * * * *